US011663576B2

(12) United States Patent
Potadar et al.

(10) Patent No.: US 11,663,576 B2
(45) Date of Patent: May 30, 2023

(54) METHODS AND APPARATUS FOR INITIATING A PAYMENT TRANSACTION BY A MISSED CALL

(71) Applicant: MASTERCARD INTERNATIONAL INCORPORATED, Purchase, NY (US)

(72) Inventors: Santosh Sitaram Potadar, Pune (IN); Pravin Parekh, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 59 days.

(21) Appl. No.: 16/305,717

(22) PCT Filed: Jun. 2, 2017

(86) PCT No.: PCT/US2017/035684
§ 371 (c)(1),
(2) Date: Nov. 29, 2018

(87) PCT Pub. No.: WO2017/213986
PCT Pub. Date: Dec. 14, 2017

(65) Prior Publication Data
US 2019/0272526 A1  Sep. 5, 2019

(30) Foreign Application Priority Data

Jun. 6, 2016 (SG) .............................. 10201604586T (51) Int. Cl.
*G06Q 20/38* (2012.01)
*G06Q 20/32* (2012.01)
(Continued)

(52) U.S. Cl.
CPC ....... *G06Q 20/325* (2013.01); *G06Q 20/3821* (2013.01); *G06Q 20/4014* (2013.01); *G06Q 20/425* (2013.01); *H04M 15/06* (2013.01)

(58) Field of Classification Search
CPC .................................................... G06Q 20/325
(Continued)

(56) References Cited

U.S. PATENT DOCUMENTS 6,088,683 A    7/2000  Jalili
7,729,989 B1 *  6/2010  Yuen ..................... G06Q 20/12
                                                      705/44

(Continued)

*Primary Examiner* — Chinedu C Agwumezie
(74) *Attorney, Agent, or Firm* — Barta, Jones & Foley, PLLC (57) ABSTRACT

A computer implemented method, in a transaction processing server, of initiating a transaction, is disclosed. The method comprises: receiving, from a server associated with a merchant, an indication of a pending transaction between the merchant and a consumer; receiving, from a missed call processing server, an indication of a missed call made by the consumer, the indication of the missed call made by the consumer comprising an indication of a telephone number associated with the consumer; identifying the missed call made by the consumer with the pending transaction between the merchant and the consumer; looking up, in a consumer account database, an account associated with the consumer using the telephone number associated with the consumer; and generating a transaction authorization request for a transaction between the account associated with the consumer and an account associated with the merchant.

20 Claims, 4 Drawing Sheets

(51) Int. Cl.
*G06Q 20/42* (2012.01)
*H04M 15/06* (2006.01)
*G06Q 20/40* (2012.01)

(58) Field of Classification Search
USPC .......................................................... 705/75
See application file for complete search history.

(56) References Cited

U.S. PATENT DOCUMENTS

| | | |
|---|---|---|
| 2007/0174080 A1 | 7/2007 | Outwater |
| 2008/0010159 A1* | 1/2008 | Rossides ................ G06Q 30/02 705/14.73 |
| 2012/0253852 A1* | 10/2012 | Pourfallah ........... G06Q 20/326 705/41 |
| 2013/0003955 A1* | 1/2013 | Swamy ................... H04M 3/42 379/201.01 |
| 2016/0132853 A1 | 5/2016 | Kumar et al. |

* cited by examiner

METHODS AND APPARATUS FOR INITIATING A PAYMENT TRANSACTION BY A MISSED CALL

CROSS-REFERENCE TO RELATED APPLICATIONS APPLICATION

This application is a U.S. national stage filing under 35 U.S.C. § 371 of International Application No. PCT/US2017/035684, filed on Jun. 2, 2017, which claims the benefit of, and priority to, Singapore Application No. 10201604586T filed on Jun. 6, 2016. The entire disclosures of the above applications are incorporated herein by reference.

TECHNICAL FIELD AND BACKGROUND

The present disclosure relates to methods and apparatus for initiating a transaction. In particular, it provides methods and systems for initiating a transaction by a missed call.

One of the most fundamental and easy to use features of a mobile telephone is the ability to make telephone calls. There have recently been many developments in the mobile payment sphere and there are now many ways of using a mobile telephone to make a payment. However, many of these payment methods require additional functionality or applications to be added to a user's device for the user to make a payment.

SUMMARY

In general terms, the present disclosure proposes a method of initiating a transaction by placing a missed call. A merchant provides a customer with a telephone number for the customer to call to initiate a payment. The merchant establishes a pending transaction when the telephone number is provided to the customer. The customer then makes a missed call to the number, and this missed call is matched to the pending transaction and a transaction authorization request is generated.

Thus embodiments of the present invention provide a way of making payment using a mobile telephone without the requirement for additional applications or functionality to be added to the mobile telephone.

According to a first aspect of the present invention, there is provided a computer implemented method, in a transaction processing server, of initiating a transaction. The method comprises: receiving, from a server associated with a merchant, an indication of a pending transaction between the merchant and a consumer; receiving, from a missed call processing server, an indication of a missed call made by the consumer, the indication of the missed call made by the consumer comprising an indication of a telephone number associated with the consumer; identifying the missed call made by the consumer with the pending transaction between the merchant and the consumer; looking up, in a consumer account database, an account associated with the consumer using the telephone number associated with the consumer; and generating a transaction authorization request for a transaction between the account associated with the consumer and an account associated with the merchant.

In an embodiment the indication of the missed call made by the consumer further comprises an indication of a telephone number called by the consumer, and wherein identifying the missed call made by the consumer with the pending transaction comprises using the telephone number called by the consumer to identify the missed call made by the consumer with the pending transaction between the merchant and the consumer.

In an embodiment the indication of the pending transaction between the merchant and the consumer comprises an indication of a transaction amount and wherein the transaction initiated between the account associated with the consumer and the account associated with the merchant is a transaction of the transaction amount.

In an embodiment the method further comprises setting a transaction session window for the pending transaction in response to receiving the indication of the pending transaction, the transaction session window indicating a time period, and wherein the transaction authorization request is generated if the missed call is made by the consumer within the transaction session window.

In an embodiment the indication of a missed call made by the consumer further comprises an indication of an authentication code input by the consumer, and wherein the transaction authorization request comprises an indication of the authentication code. The authentication code may be a PIN number.

In an embodiment the method further comprises receiving a transaction authorization response in response to the transaction authorization request and generating a transaction success message. The indication of the pending transaction may comprise a transaction identifier and the transaction success message may comprise an indication of the transaction identifier.

According to a second aspect of the present invention there is provided an apparatus for initiating a transaction. The apparatus comprises: a computer processor and a data storage device, the data storage device having an transaction matching module; a consumer account look up module; and a transaction authorization request generation module comprising non-transitory instructions operative by the processor to: receive, from a server associated with a merchant, an indication of a pending transaction between a merchant and a consumer; receive, from a missed call processing server, an indication of a missed call made by the consumer, the indication of the missed call made by the consumer comprising an indication of a telephone number associated with the consumer; identify the missed call made by the consumer with the pending transaction between the merchant and the consumer; look up, in a consumer account database, an account associated with the consumer using the telephone number associated with the consumer; and generate a transaction authorization request for a transaction between the account associated with the consumer and an account associated with the merchant.

According to a third aspect of the present invention there is provided a computer implemented method, in a transaction processing system, of initiating a transaction. The method comprises: generating, in a server associated with a merchant, an indication of a pending transaction between the merchant and a consumer; generating, in the server associated with the merchant, a bill message associated with transaction, the bill message comprising an indication of a payment initiation telephone number; receiving a missed call to the payment initiation telephone number; determining an originating number associated with the missed call; looking up, in a consumer account database, an account associated with the consumer using the telephone number associated with the consumer; and generating a transaction authorization request for a transaction between the account associated with the consumer and an account associated with the merchant.

In an embodiment the method further comprises establishing a data exchange session with a user device corresponding to the originating number associated with the missed call and receiving an authentication code from the user device during the data exchange session, and wherein the transaction authorization request comprises the authentication code.

The data exchange session may be an unstructured supplementary service data session. The authentication code is may be a PIN number.

In an embodiment the method further comprises sending the bill message to a user device associated with the consumer.

In an embodiment the indication of the pending transaction between the merchant and the consumer comprises an indication of a transaction amount and wherein the transaction initiated between the account associated with the consumer and the account associated with the merchant is a transaction of the transaction amount.

In an embodiment the method further comprises setting a transaction session window for the pending transaction, the transaction session window indicating a time period, and wherein the transaction authorization request is generated if the missed call is made by the consumer within the transaction session window.

In an embodiment the method further comprises receiving a transaction authorization response in response to the transaction authorization request and generating a transaction success message.

In an embodiment the indication of the pending transaction comprises a transaction identifier and wherein the transaction success message comprises an indication of the transaction identifier.

According to a fourth aspect of the present invention there is provided a transaction processing system comprising: a first server, associated with a merchant, operable to: generate an indication of a pending transaction between the merchant and a consumer; and generate a bill message associated with transaction, the bill message comprising an indication of a payment initiation telephone number; a missed call processing server operable to: receive a missed call to the payment initiation telephone number; and determine an originating number associated with the missed call; and a transaction processing server operable to: look up, in a consumer account database, an account associated with the consumer using the telephone number associated with the consumer; and generate a transaction authorization request for a transaction between the account associated with the consumer and an account associated with the merchant.

According to a yet further aspect, there is provided a non-transitory computer-readable medium. The computer-readable medium has stored thereon program instructions for causing at least one processor to perform operations of a method disclosed above.

BRIEF DESCRIPTION OF THE DRAWINGS

Embodiments of the invention will now be described for the sake of non-limiting example only, with reference to the following drawings in which.

DETAILED DESCRIPTION

Figure 1:
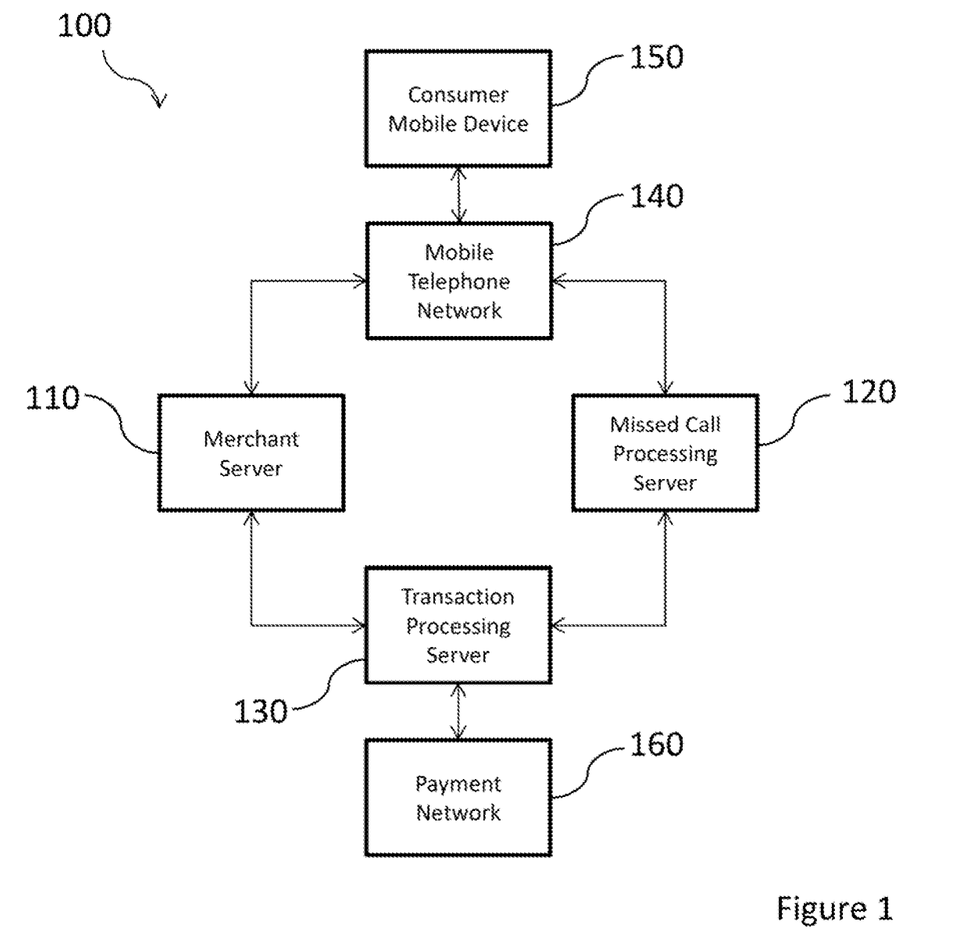
FIG. 1 is a block diagram showing a system for initiating a transaction according to an embodiment of the present invention.

FIG. 1 is a block diagram showing a system for initiating a transaction according to an embodiment of the present invention. The system 100 comprises a merchant server 110; a missed call processing server 120 and a transaction processing server 130. The merchant server 110 is a server associated with a merchant. In the present description, the term 'merchant' is intended to mean a party, such as a business that accepts payments for products or services sold to a consumer. Non-limiting examples of a merchant are a shop or store offering products and/or services for sale; a utility provider that provides a service and issues bills for payment; and e-commerce merchants offering goods and/or services through the internet.

The merchant server 110 and the missed call processing server 120 are both connected to a mobile telephone network 140. A consumer mobile device 150 such as a smartphone is also connected to the mobile telephone network 140.

The transaction processing server 130 is connected to a payment network 160. Non-limiting examples of the payment network are a payment card type of network such as the payment processing network operated by MasterCard. The various communication may take place via any types of network, for example, virtual private network (VPN), the Internet, a local area and/or wide area network (LAN and/or WAN), and so on.

Figure 2:
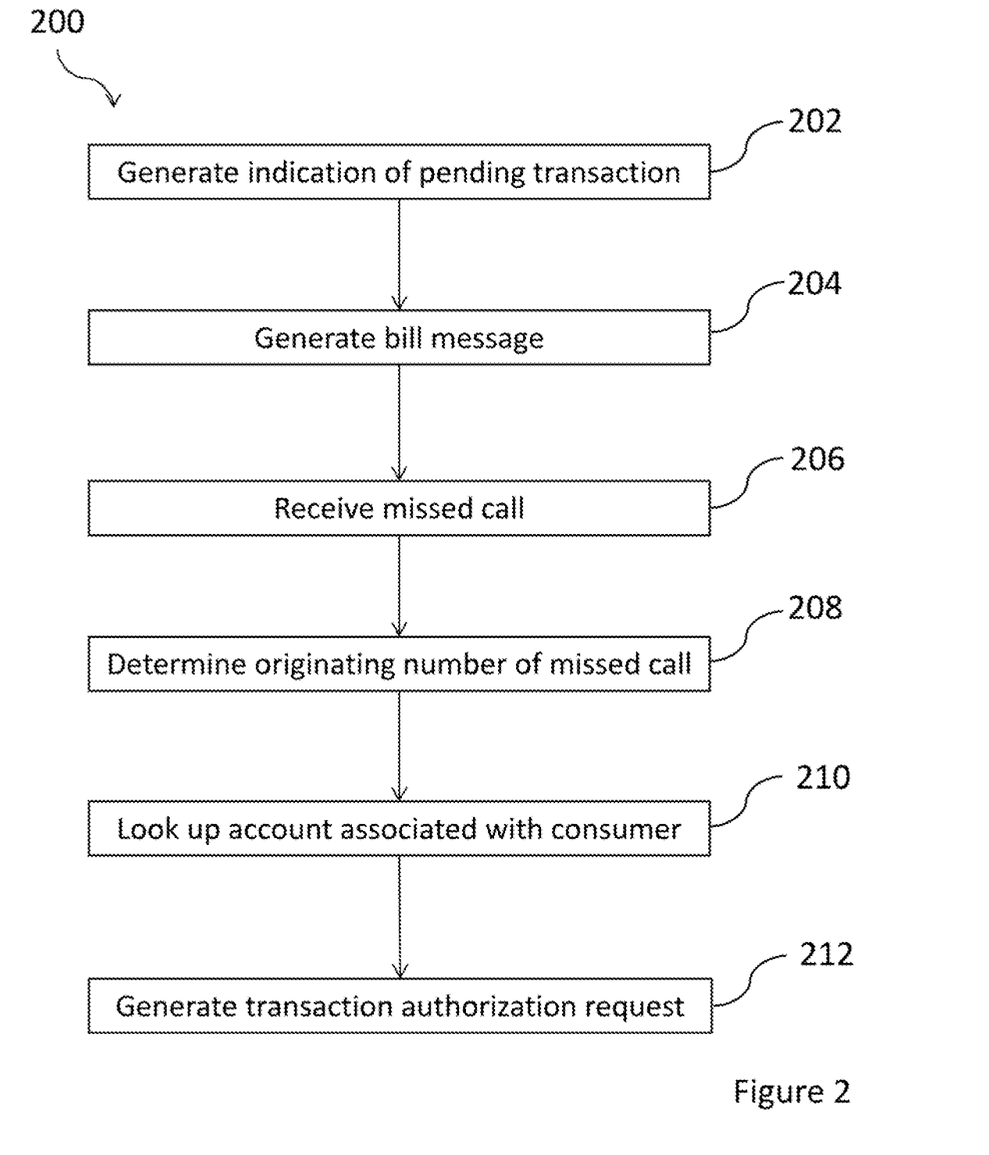
FIG. 2 is a flow chart showing a method of initiating a transaction by a missed call according to an embodiment of the present invention.

FIG. 2 is a flow chart showing a method of initiating a transaction by a missed call according to an embodiment of the present invention. The method 200 shown in FIG. 2 shows the processing carried out by the system 100 shown in FIG. 1.

The method 200 shown in FIG. 2 may be started in a number of possible scenarios. One possible scenario is that a consumer walks into a retail store and selects a product or a plurality of products for purchase, the consumer then goes to a checkout at the retail store and chooses to pay for the selected product or products by placing a missed call. In this scenario, the merchant is the store and the merchant server 110 is a server associated with the store.

Another possible scenario is payment of a utility bill by a placing a missed call. In this scenario, a utility provider issues a bill for providing a utility service and the consumer decides to pay the bill by placing a missed call.

A further possible scenario is an e-commerce scenario. In this scenario, the consumer logs onto an e-commerce website or portal and selects a product or a plurality of products for purchase. These products are added to a virtual shopping cart. Once the consumer has selected all of the products that they wish to purchase, the consumer selects an option to checkout. At this point an option may be provided to the consumer to pay by placing a missed call.

As described above, in each of the possible scenarios, there is a transaction between the consumer and the merchant. In step 202 of the method 200, the merchant server 202 generates an indication of a pending transaction. The indication of the pending transaction may comprise an indication of a transaction amount. The transaction amount may be the total amount of the consumer's bill for goods and/or services. Alternatively, the transaction amount may also be a portion of the consumer's bill which the consumer has opted to pay through the missed call mechanism.

The merchant server 110 sends the indication of the pending transaction to the transaction processing server 130. The transaction processing server 130 may set a transaction session window in response to receiving the indication of the pending transaction. The length of the transaction session window may depend on the scenario. For example in retail store or e-commerce scenario, the transaction session window may be set as up to 30 minutes. In the utility billing scenario, the transaction session window may be set as up to 7 days, for example.

In step 204, the merchant server 110 generates a bill message. The bill message may be sent to the consumer mobile device 150 via the mobile network, for example as a text message. Alternatively, the bill message may be sent by another medium, for example as a letter or email. Alternatively, the bill message may be provided by the merchant to the consumer on a paper receipt or on a display at the checkout terminal, in clear text and/or as a bar code or QR code.

The bill message indicates the bill amount and also indicates a telephone number for the consumer to call to pay the bill by placing a missed call. The telephone number may be a toll-free number. The bill message may also include instructions for the consumer to call the telephone number in order to pay the bill.

In order to pay the bill, the consumer calls the telephone number indicated in the bill message. The consumer makes a missed call to the telephone number to make the payment indicated in the bill message.

In step 206, the missed call processing server 120 receives the missed call. The mobile telephone network 140 may route calls made to the telephone number indicated in the bill message to the missed call processing server 120. The missed call processing server 120 may be configured to disconnect the call after a set period, such as one ring.

In step 208, the missed call processing server 120 determines the originating number of the missed call.

In some embodiments, the missed call processing server 120 may establish a data exchange session such as an unstructured supplementary service data (USSD) session with the consumer mobile device 150. During the data exchange session, the consumer may be prompted to enter an authentication code such as a PIN number. In an embodiment, the PIN may be added to the end of the telephone number. In such an embodiment, the missed call processing server 120 extracts the PIN from the numbers entered by the consumer at the end of the telephone number.

The missed call processing server 120 may be implemented as a USSD aggregator.

The information on the missed call is then transferred from the missed call processing server 120 to the transaction processing server 130. The information transferred from the missed call processing server 120 to the transaction processing server 130 may include an indication of the telephone number of consumer module device 150 that made the missed call; an indication of the PIN number or authentication code received from the consumer mobile device 150; an indication of the number called to make the missed call.

The connection between the missed call processing server 120 and the transaction processing server 130 may be implemented as a secure connection such as a hypertext transfer protocol secure (HTTPS) connection.

In step 210, the transaction processing server 130 looks up an account associated with the consumer using the telephone number of the consumer mobile device 150 used to make the missed call.

The transaction processing server 130 uses a database of registered consumers which specifies consumer mobile device telephone numbers and linked payment account details. It is envisaged that a number of different payment instruments may be linked to telephone numbers for use in the methods and systems described herein. For example, the database may include links to payment card accounts such as credit card or debit card accounts; bank accounts; mobile wallet accounts; and on-line payment accounts.

In step 212, the payment processing server 130 generates a transaction authorization request for a payment from the account associated with the consumer looked up in step 210 and an account associated with the merchant. The transaction authorization request may be sent for authorization over the payment network 160. The transaction authorization request may include the authentication code such as a PIN number obtained from the consumer after the missed call was completed.

As described above, in some embodiments, the transaction processing server 130 checks that the missed call was made by the consumer within the transaction session window set by the merchant server 110. If the missed call was made outside the transaction session window, a message indicating that the transaction was not successful may be sent to the user. Similarly, a message indicating that the transaction was not successful may also be sent to the user, for example by a text message, if a negative response to the transaction authorization request is received, which may be caused by an incorrect authentication code or the payment authorization being refused by the payment instrument provider.

If the payment is authorized, the transaction processing server 130 receives a payment authorization message from the payment network 160 in response to the transaction authorization request generated in step 212. A message indicating that the payment was successful is sent to the consumer. The message may include an indication of a transaction identifier provided by the merchant. In the retail store scenario described above, the consumer may use this transaction identifier in the message indicating that the transaction was successful to demonstrate to the merchant that the payment has been successfully made.

Figure 3:
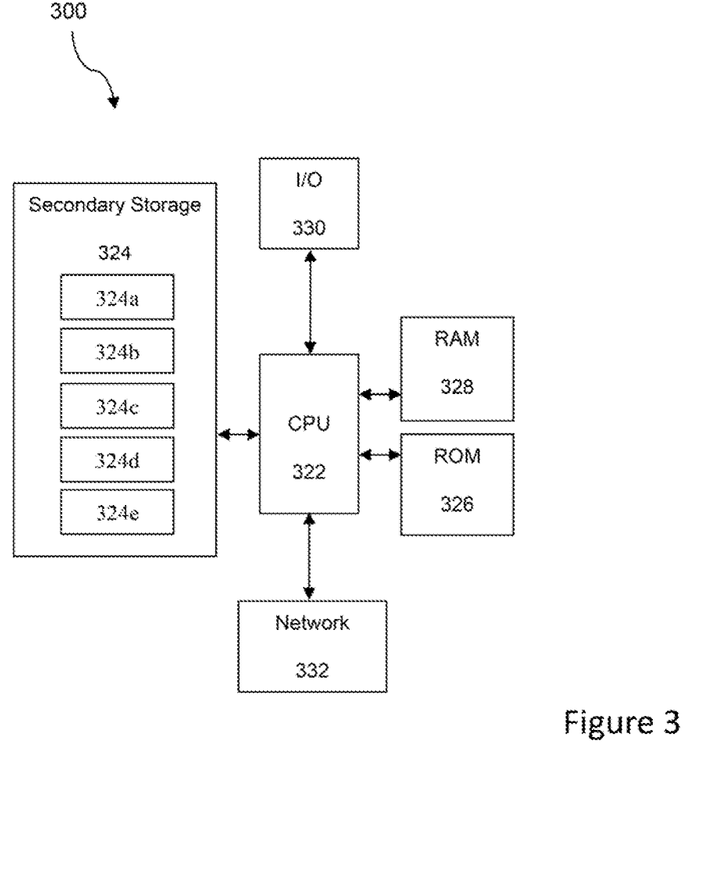
FIG. 3 is a block diagram showing a technical architecture of a transaction processing server according to an embodiment of the present invention.

FIG. 3 is a block diagram showing a technical architecture 300 of the transaction processing server 130 for performing an exemplary method 400 which is described below with reference to FIG. 4. Typically, the method 400 is implemented by a number of computers each having a data-processing unit. The block diagram as shown in FIG. 3 illustrates a technical architecture 300 a computer which is suitable for implementing one or more embodiments herein.

The technical architecture 300 includes a processor 322 (which may be referred to as a central processor unit or CPU) that is in communication with memory devices including secondary storage 324 (such as disk drives), read only memory (ROM) 326, random access memory (RAM) 328. The processor 322 may be implemented as one or more CPU chips. The technical architecture 320 may further comprise input/output (I/O) devices 330, and network connectivity devices 332.

The secondary storage 324 is typically comprised of one or more disk drives or tape drives and is used for non-volatile storage of data and as an over-flow data storage device if RAM 328 is not large enough to hold all working data. Secondary storage 324 may be used to store programs which are loaded into RAM 328 when such programs are selected for execution. In this embodiment, the secondary storage 324 has a session setting module 324a; a transaction matching module 324b; a consumer account look up module 324c; a transaction authorization request generation module 324d and a message generation module 324e comprising non-transitory instructions operative by the processor 322 to perform various operations of the method of the present disclosure. The ROM 326 is used to store instructions and perhaps data which are read during program execution. The secondary storage 324, the RAM 328, and/or the ROM 326 may be referred to in some contexts as computer readable storage media and/or non-transitory computer readable media.

I/O devices 330 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 332 may enable the processor 322 to communicate with the Internet or one or more intranets. With such a network connection, it is contemplated that the processor 322 might receive information from the network, or might output information to the network in the course of performing the above-described method operations. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 300, at least one of the CPU 322, the RAM 328, and the ROM 326 are changed, transforming the technical architecture 300 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Although the technical architecture 300 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 300 to provide the functionality of a number of servers that is not directly bound to the number of computers in the technical architecture 300. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

Various operations of the exemplary method 400 will now be described with reference to FIG. 4 in respect of initiation of a transaction. It should be noted that enumeration of operations is for purposes of clarity and that the operations need not be performed in the order implied by the enumeration.

Figure 4:
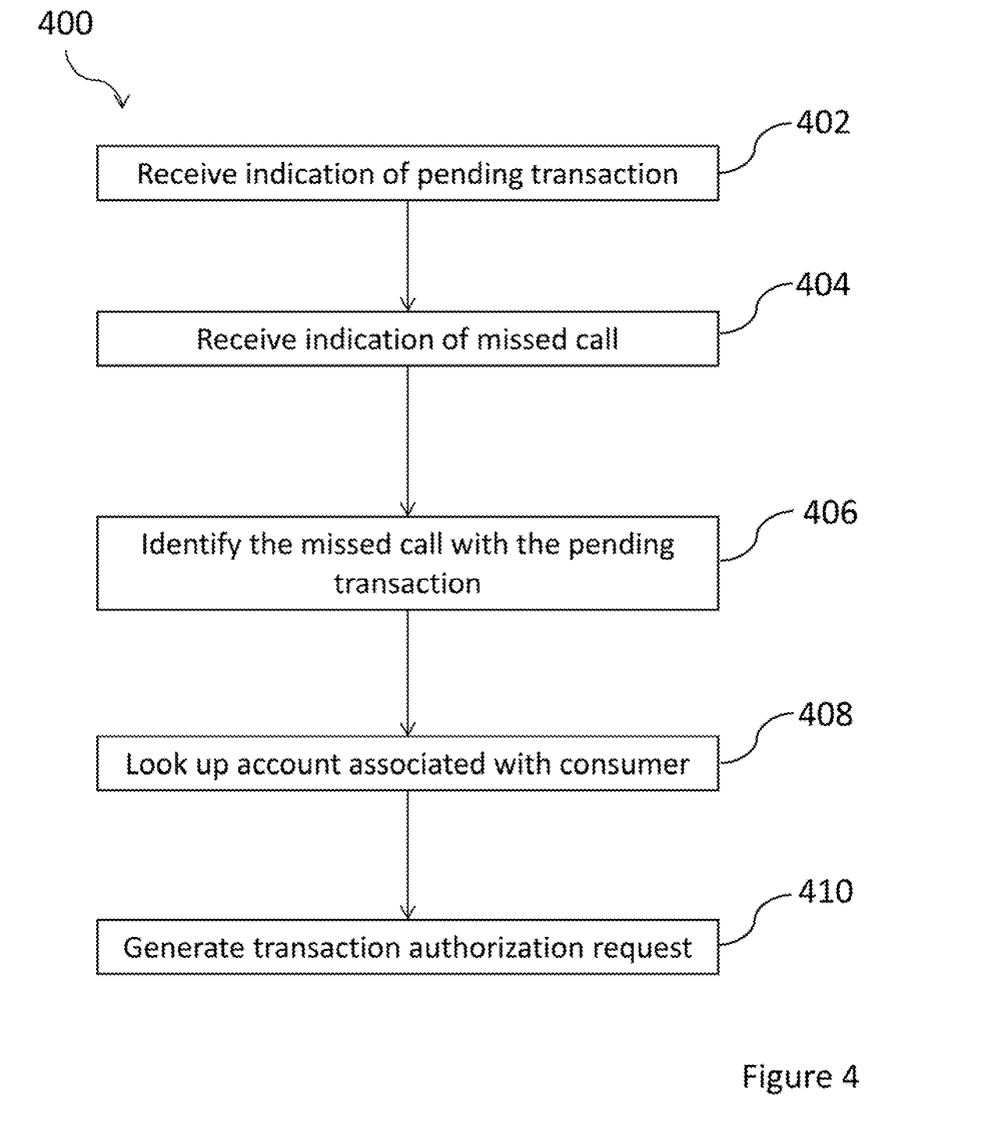
FIG. 4 is a flow chart showing a method of initiating a transaction according to an embodiment of the present invention.

FIG. 4 is a flow chart showing a method of initiating a transaction according to an embodiment of the present invention.

In step 402, the transaction processing server 130 receives an indication of a pending transaction from the merchant server 110. As described above, the indication of the pending transaction comprises an indication of a transaction amount to be paid by the consumer to the merchant.

In response to receiving the indication of a pending transaction in step 402, the session setting module 324a of the transaction processing server 130 may set a transaction session window.

In step 404, the transaction processing server 130 receives an indication of a missed call placed by the consumer from the missed call processing server 120. The indication of the missed call includes an indication of the consumer mobile device 150 from which the missed call was received. The indication of the missed call may also include an indication of the number called by the consumer to make the missed call. In some embodiments, the merchant may have a number of different telephone numbers to allow multiple pending transactions to be set concurrently. The indication of the number called by the consumer may also be used in the later processing to identify the merchant to which the payment is to be made.

As discussed above, in some embodiments, a data exchange session may be initiated after the missed call is completed. In these embodiments, the indication of the missed call received by the transaction processing server in step 404 may also include an indication of the authentication code such as a PIN number entered by the consumer during the data exchange session.

In step 406, the transaction matching module 324b matches the missed call made by the consumer to a pending transaction. The transaction processing server 130 may store indications of pending transactions with open session windows and then when an indication of a missed call is received, identify a pending transaction with the missed call. As described above, the number called by the consumer to make the missed call may be used to identify the missed call with one of the pending transactions.

In step 408, the consumer account look up module 324c looks up an account associated with the consumer using the telephone number of the consumer mobile device.

In step 410, the transaction authorization request generation module 324d generates a transaction authorization request for a transaction between the consumer and the merchant for the amount indicated by the pending transaction. The transaction authorization request may also include the authentication code entered by the consumer. The transaction authorization request is sent over the payment network 160 for authorization.

In response to the transaction authorization request, the transaction processing server 130 receives a transaction authorization response. The transaction authorization response indicates whether the transaction has been successfully authorized or not.

The message generation module 324e of the transaction processing server generates a message to the consumer indicating whether the transaction is successful or not. The message to the consumer may also include a transaction identifier for the merchant.

Whilst the foregoing description has described exemplary embodiments, it will be understood by those skilled in the art that many variations of the embodiment can be made within the scope and spirit of the present invention.

What is claimed is:

1. A computer implemented method of initiating a transaction, the method comprising:
   receiving, from a server associated with a merchant, an indication of a pending transaction between the merchant and a consumer comprising a total transaction amount and a portion of the total transaction amount less than the total transaction amount associated with the pending transaction the consumer has opted to pay using the transaction, the portion of the total transaction amount being less than the total transaction amount;
   based on the received indication, defining a transaction session window for the pending transaction, wherein the transaction session window is a time period within which a missed call is expected and the time period is set by the merchant depending on a type of transaction to be completed;
   receiving a quick response code generated by the merchant, indicating the total transaction amount associated with the pending transaction and a first telephone number for the consumer to call to pay the portion of the total transaction amount by placing the missed call;
   receiving, from a missed call processing server, an indication of the missed call made by the consumer comprising an indication of a second telephone number associated with the consumer and an indication of an authentication code input by the consumer;
   identifying the missed call made by the consumer with the pending transaction between the merchant and the consumer;
   identifying, in a consumer account database, an account associated with the consumer using the second telephone number associated with the consumer; and
   generating a transaction authorization request, based on the missed call being received within the defined transaction session window for the pending transaction, for the pending transaction between the identified account associated with the consumer and an account associated with the merchant, the transaction authorization request comprising the indication of the authentication code.

2. The method according to claim 1, wherein:
   the indication of the missed call made by the consumer further comprises an indication of a telephone number called by the consumer, and
   identifying the missed call made by the consumer with the pending transaction comprises using the telephone number called by the consumer to identify the missed call made by the consumer with the pending transaction between the merchant and the consumer.

3. The method according to claim 1, wherein:
   the indication of the missed call made by the consumer is made after receiving the indication of the pending transaction between the merchant and the consumer, and
   the transaction initiated between the account associated with the consumer and the account associated with the merchant is a transaction of the total transaction amount.

4. The method according to claim 1, wherein:
   the quick response code indicates a bill message received prior to receiving the indication of receiving the missed call.

5. The method according to claim 1, wherein the type of transaction to be completed is selected from at least one of a retail store, a utility bill, or e-commerce.

6. The method according to claim 1, further comprising:
   receiving a transaction authorization response in response to the transaction authorization request;
   processing the transaction based on the received transaction authorization response; and
   generating a transaction success message,
   wherein the indication of the pending transaction comprises a transaction identifier and wherein the transaction success message comprises an indication of the transaction identifier.

7. An apparatus for initiating a transaction, the apparatus comprising:
   a computer processor and a data storage device, the data storage device having a transaction matching module; a consumer account look up module; and a transaction authorization request generation module comprising non-transitory instructions that, when executed by the computer processor, cause the computer processor to:
   receive, from a server associated with a merchant, an indication of a pending transaction between a merchant and a consumer comprising a total transaction amount and a portion of the total transaction amount less than the total transaction amount associated with the pending transaction the consumer has opted to pay using the transaction, the portion of the total transaction amount being less than the total transaction amount;
   based on the received indication, define a transaction session window for the pending transaction, wherein the transaction session window is a time period within which a missed call is expected and the time period is set by the merchant depending on a type of transaction to be completed;
   receive a quick response code generated by the merchant indicating the total transaction amount associated with the pending transaction and a first telephone number for the consumer to call to pay the portion of the total transaction amount by placing the missed call;
   receive, from a missed call processing server, an indication of the missed call made by the consumer comprising an indication of a second telephone number associated with the consumer and an indication of an authentication code input by the consumer;

identify the missed call made by the consumer with the pending transaction for a transaction amount between the merchant and the consumer;

identify, in a consumer account database, an account associated with the consumer using the second telephone number associated with the consumer; and generate a transaction authorization request, based on the missed call being received within the defined transaction session window for the pending transaction, for the pending transaction between the identified account associated with the consumer and an account associated with the merchant, the transaction authorization request comprising the indication of the authentication code.

8. The apparatus according to claim 7, wherein the indication of the missed call made by the consumer further comprises an indication of a telephone number called by the consumer, and wherein the transaction matching module further comprises non-transitory instructions operative by the computer processor to: identify the missed call made by the consumer with the pending transaction using the telephone number called by the consumer to identify the missed call made by the consumer with the pending transaction between the merchant and the consumer.

9. The apparatus according to claim 7, wherein the transaction authorization request generation module further comprises non-transitory instructions that, when executed by the computer processor, cause the computer processor to receive, prior to receiving the indication of the missed call, a bill message from the server indicating the total transaction amount based on the received indication of the pending transaction.

10. The apparatus according to claim 7, wherein the type of transaction is an e-commerce transaction, wherein the data storage device further has non-transitory instructions that, when executed by the computer processor, cause the computer processor to provide an option to pay at least the portion of the total transaction amount by placing the missed call.

11. The apparatus according to claim 7, wherein the type of transaction to be completed is selected from at least one of a retail store, a utility bill, or e-commerce.

12. The apparatus according to claim 7, wherein the data storage device further comprises a message generation module comprising non-transitory instructions operative by the computer processor to: generate a transaction success message in response to receiving a transaction authorization response; and wherein the indication of the pending transaction comprises a transaction identifier and wherein the transaction success message comprises an indication of the transaction identifier.

13. A computer implemented method of initiating a transaction, the method comprising:

generating, in a server associated with a merchant, an indication of a pending transaction between the merchant and a consumer comprising a total transaction amount and a portion of the total transaction amount less than the total transaction amount associated with the pending transaction the consumer has opted to pay using the transaction, the portion of the total transaction amount being less than the total transaction amount, wherein a transaction session window for the pending transaction is defined based on the generated indication, wherein the transaction session window is a time period within which a missed call is expected and the time period is set by the merchant depending on a type of transaction to be completed;

generating, in the server associated with the merchant, a quick response code indicating the total transaction amount associated with the pending transaction and a payment initiation telephone number for the consumer to call to pay the portion of the total transaction amount by placing the missed call;

receiving the missed call to the payment initiation telephone number;

determining an originating number associated with the missed call;

establishing a data exchange session with a user device corresponding to the originating number associated with the missed call and receiving an authentication code from the user device during the data exchange session;

identifying, in a consumer account database, an account associated with the consumer using the determined originating number; and generating a transaction authorization request, based on the missed call being received within the defined transaction session window for the pending transaction, for the pending transaction between the identified account associated with the consumer and an account associated with the merchant based on the missed call being made within the transaction session window, the transaction authorization request comprising the authentication code.

14. The method according to claim 13, wherein the data exchange session is an unstructured supplementary service data (USSD) session.

15. The method according to claim 13, wherein establishing the data exchange session includes:

receiving the authentication code from the user device, appending the authentication code to the payment initiation telephone number, and extracting the authentication code to authorize the user device.

16. The method according to claim 13, further comprising sending the quick response code to the user device associated with the consumer.

17. The method according to claim 13, wherein the indication of the pending transaction between the merchant and the consumer comprises an indication of a transaction amount, and wherein the transaction initiated between the account associated with the consumer and the account associated with the merchant is a transaction of the transaction amount.

18. The method according to claim 13, wherein the type of transaction to be completed is selected from at least one of a retail store, a utility bill, or e-commerce.

19. The method according to claim 13, further comprising receiving a transaction authorization response in response to the transaction authorization request and generating a transaction success message.

20. The method according to claim 19, wherein the indication of the pending transaction comprises a transaction identifier and wherein the transaction success message comprises an indication of the transaction identifier.

* * * * *